United States Patent
Rizea et al.

(10) Patent No.: US 11,794,134 B2
(45) Date of Patent: Oct. 24, 2023

(54) MULTIPHASE SEPARATION AND PRESSURE LETDOWN METHOD

(71) Applicant: Deep Reach Technology, Inc., Houston, TX (US)

(72) Inventors: Steven Rizea, Orlando, FL (US); James Wodehouse, Llano, NM (US); Paul Smith, Mill Creek, WA (US); John Halkyard, Houston, TX (US); Michael Rai Anderson, Sugar Land, TX (US)

(73) Assignee: Deep Reach Technology, Inc., Houston, TX (US)

( * ) Notice: Subject to any disclaimer, the term of this patent is extended or adjusted under 35 U.S.C. 154(b) by 173 days.

(21) Appl. No.: 17/415,713

(22) PCT Filed: Dec. 19, 2019

(86) PCT No.: PCT/US2019/067510
§ 371 (c)(1),
(2) Date: Jun. 17, 2021

(87) PCT Pub. No.: WO2020/132261
PCT Pub. Date: Jun. 25, 2020

(65) Prior Publication Data
US 2022/0062796 A1    Mar. 3, 2022

Related U.S. Application Data

(60) Provisional application No. 62/783,165, filed on Dec. 20, 2018.

(51) Int. Cl.
*B01D 21/00* (2006.01)
*B01D 21/24* (2006.01)
(Continued)

(52) U.S. Cl.
CPC ......... *B01D 21/10* (2013.01); *B01D 21/0012* (2013.01); *B01D 21/0087* (2013.01);
(Continued)

(58) Field of Classification Search
CPC ............ B01D 19/0036; B01D 21/0012; B01D 21/0024; B01D 21/02; B01D 21/10; B01D 21/2405; B01D 21/245; B01D 21/2461; B01D 21/2494; B01D 21/0087; B01D 21/267; B01D 21/34; C02F 11/121;
(Continued)

(56) References Cited

U.S. PATENT DOCUMENTS 3,456,371 A    7/1969  Graham et al.
3,923,652 A  * 12/1975  Condolios ............ B01D 21/245
                                                                  210/533
(Continued)

OTHER PUBLICATIONS

Notification of international search report and written opinion of the international searching authority based on PCT/US19/67510, dated Mar. 11, 2020, 8 pages.
(Continued)

*Primary Examiner* — Joseph W Drodge

(57) ABSTRACT

A method and apparatus for the separation of gas and liquid-solid slurry under pressure, and passage of the liquid-solid slurry to an atmospheric discharge.

18 Claims, 6 Drawing Sheets

(51) Int. Cl.
| | |
|---|---|
| *B01D 21/26* | (2006.01) |
| *C02F 11/12* | (2019.01) |
| *F04C 2/12* | (2006.01) |
| *G01F 11/22* | (2006.01) |
| *B01D 21/02* | (2006.01) |
| *C02F 11/121* | (2019.01) |
| *C02F 11/127* | (2019.01) |
| *C02F 103/10* | (2006.01) |

(52) U.S. Cl.
CPC ..... *B01D 21/2461* (2013.01); *B01D 21/2494* (2013.01); *B01D 21/267* (2013.01); *C02F 11/121* (2013.01); *C02F 11/127* (2013.01); *C02F 2103/10* (2013.01); *C02F 2303/24* (2013.01); *C02F 2303/26* (2013.01); *F04C 2/126* (2013.01); *G01F 11/22* (2013.01)

(58) Field of Classification Search
CPC .......... C02F 11/127; C02F 2103/10; C02F 2303/24; C02F 2303/26; F04C 2/126; G01F 11/22; B07B 2230/01; B07B 7/06; F16K 1/223; F16K 17/105
USPC .... 210/299, 312, 313, 519, 532.1, 533, 534, 210/535, 537, 539, 803; 96/182, 183
See application file for complete search history.

(56) References Cited

U.S. PATENT DOCUMENTS

| | | | |
|---|---|---|---|
| 5,110,457 A | 5/1992 | Krawl et al. | |
| 5,558,473 A | 9/1996 | Lindahl | |
| 6,439,267 B2 | 8/2002 | Welker | |
| 7,694,829 B2 * | 4/2010 | Veltri | C10G 1/045 210/532.1 |
| 2003/0075489 A1 | 4/2003 | Lakshman | |
| 2008/0296213 A1 * | 12/2008 | An | B01D 21/0012 210/536 |
| 2009/0211960 A1 * | 8/2009 | Nilsen | B01D 19/0036 210/532.1 |
| 2011/0036239 A1 * | 2/2011 | Sarshar | B01D 21/0012 96/216 |
| 2015/0306523 A1 | 10/2015 | Ball, IV | |
| 2016/0030861 A1 * | 2/2016 | Janssen | B01D 21/2472 210/532.1 |
| 2016/0186401 A1 * | 6/2016 | Selwa | C10G 31/09 405/210 |
| 2018/0170783 A1 | 6/2018 | Baxter et al. | |
| 2020/0114282 A1 * | 4/2020 | Johnson | B01D 21/02 |

OTHER PUBLICATIONS

Feenan, J. P. (2009) "Seafloor Massive Sulfide Mining Concept", Offshore Technology Conference, Paper 19823, Houston, Texas.

* cited by examiner

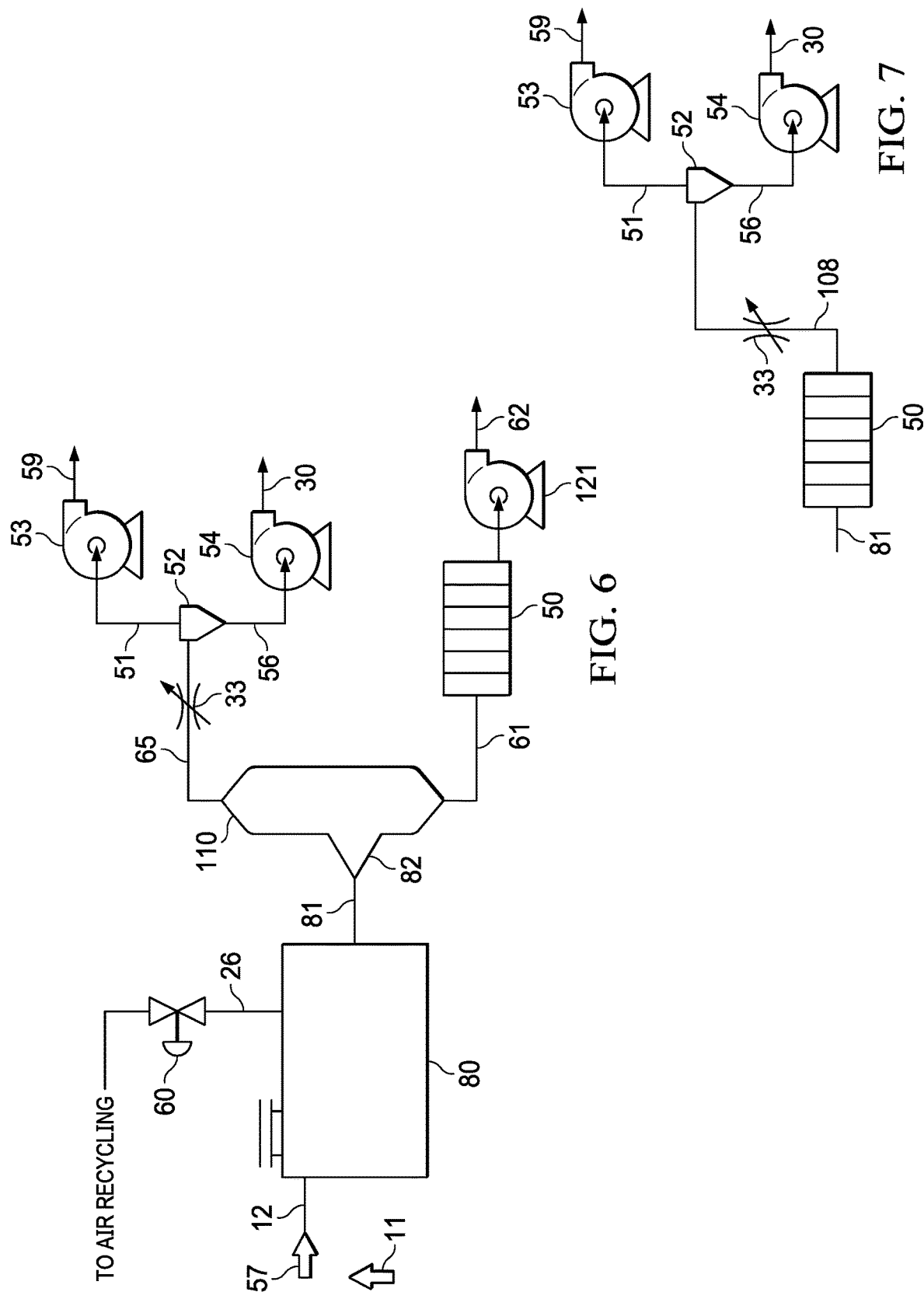

MULTIPHASE SEPARATION AND PRESSURE LETDOWN METHOD

RELATED APPLICATIONS

This application claims priority to U.S. Provisional Application No. 62/783,165, filed Dec. 20, 2018.

BACKGROUND OF THE INVENTION

There exist applications where a pressurized solid/liquid slurry is extracted from an intermediate depth and handling systems must also accept and separate a gaseous phase (e.g.—air). One example is an air lift system for deep sea mining, in this system compressed air is injected into a vertical riser pipe in the ocean. The air rises from the injection point and the mixture of air/water/solids has a density less than the surrounding seawater. This creates a suction (lift). When the air reaches the surface, it has expanded many times its original (compressed) volume. To prevent unfavorable velocities and flow conditions the discharge at the surface is pressurized to several atmospheres. The need for this in a deep-sea mining operation was recognized in the 1960s.

SUMMARY OF EXAMPLE EMBODIMENTS

An example embodiment may include an air-slurry separation system having a separating tank pressure vessel, an air-slurry inlet to separating tank pressure vessel from an airlift riser, a diffuser adapted to reduce air-slurry flow velocity through the inlet into the separating tank pressure vessel, an air release outlet located at or near the top of the separating tank pressure vessel, a fine slurry outlet located at a mid-level of the separating tank pressure vessel coupled to a fine slurry flowline, a screen on the fine slurry outlet limiting the maximum particle size that can enter the fine slurry flowline, and a coarse slurry outlet at or near the bottom of the separating tank pressure vessel coupled to a course slurry flowline.

An example embodiment may include an air-slurry separation system having a first separating tank pressure vessel for separation of air and slurry, an air-slurry inlet to the first separating tank pressure vessel from an airlift riser, a diffuser adapted to reduce air-slurry flow velocity through the inlet into the first separating tank pressure vessel, an air release outlet located at or near the top of the first separating tank pressure vessel, a slurry outlet located at the bottom of the of the first separating tank pressure vessel coupled to a slurry flowline, a second separating tank pressure vessel for pressure letdown of a slurry, a fine slurry outlet located at or near the top of the second separating tank pressure vessel coupled to a fine slurry flowline, a screen on the fine slurry outlet limiting the maximum particle size that can enter the fine slurry flowline, and a coarse slurry outlet at or near the bottom of the second separating tank pressure vessel coupled to a course slurry flowline.

An example embodiment may include an air-slurry separation system having a separating tank pressure vessel for separation of air and slurry, an air-slurry inlet to the separating tank pressure vessel from an airlift riser, a diffuser adapted to reduce air-slurry flow velocity through the inlet into the separating tank pressure vessel, an air release outlet located at or near the top of the first separating tank pressure vessel, a slurry outlet located at the bottom of the of the first separating tank pressure vessel coupled to a slurry flowline, a crusher attached to the slurry flowline to limit the maximum particle size in a fine slurry flowline exiting the crusher.

A variation of the any of the example embodiments disclosed may include a fine slurry pressure letdown system on the fine slurry flowline. It may include one or more fixed chokes in the fine slurry flow. It may include one or more variable orifice valves in the fine slurry flowline. It may include one or more fixed chokes in-line with the variable orifice valves. The variation may include one or more fixed chokes in line with the fine slurry flow line and one or more choke loops with multiple fixed chokes and valves to control the number of fixed chokes through which the fine slurry flows. It may include a hydrocyclone after the fixed chokes on the fine slurry flowline. It may include comprising a hydrocyclone after the variable orifice valves on the fine slurry flowline. It may include a hydrocyclone after the fixed chokes on the fine slurry flowline. It may include a hydrocyclone after the fixed chokes and choke loops in the fine slurry flowline. It may include a coarse slurry pressure letdown on the coarse slurry flowline. The coarse slurry flow pressure letdown may be a rotary feeder with pressure differential capability. The coarse slurry pressure letdown may be a progressive cavity pump. The coarse slurry pressure letdown may be a lobe pump. It may include a screw conveyer between the separating tank pressure vessel and the coarse slurry pressure letdown. It may include a cleanout opening in the separation tank pressure vessel. It may include a level bridle in the separation tank pressure vessel. It may include a solid-liquid separating device on the coarse slurry flowline after the coarse slurry pressure letdown. It may include a vertical cuttings dryer after to coarse slurry pressure letdown. It may include a settling tank on the coarse slurry flowline after the coarse slurry pressure letdown. It may include a crusher on the coarse slurry flowline before the coarse slurry pressure letdown. It may include a lobe pump on the coarse slurry overflow flowline and a lobe pump on the coarse slurry underflow flowline from the hydrocyclone. It may include a lobe pump on the coarse slurry overflow flowline and a lobe pump on the coarse slurry underflow flowline from the hydrocyclone. It may include a lobe pump on the coarse slurry overflow flowline and a lobe pump on the coarse slurry underflow flowline from the hydrocyclone. It may include a lobe pump on the coarse slurry overflow flowline and a lobe pump on the coarse slurry underflow flowline from the hydrocyclone.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly:

FIG. 6 shows an example embodiment using a sequential gas and slurry separation method using a gravity separator.

FIG. 7 shows an example embodiment of a slurry discharge system using a crusher and hydrocyclone separators to establish flow paths for relatively fine and coarse slurries to pass through different pressure letdown devices.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
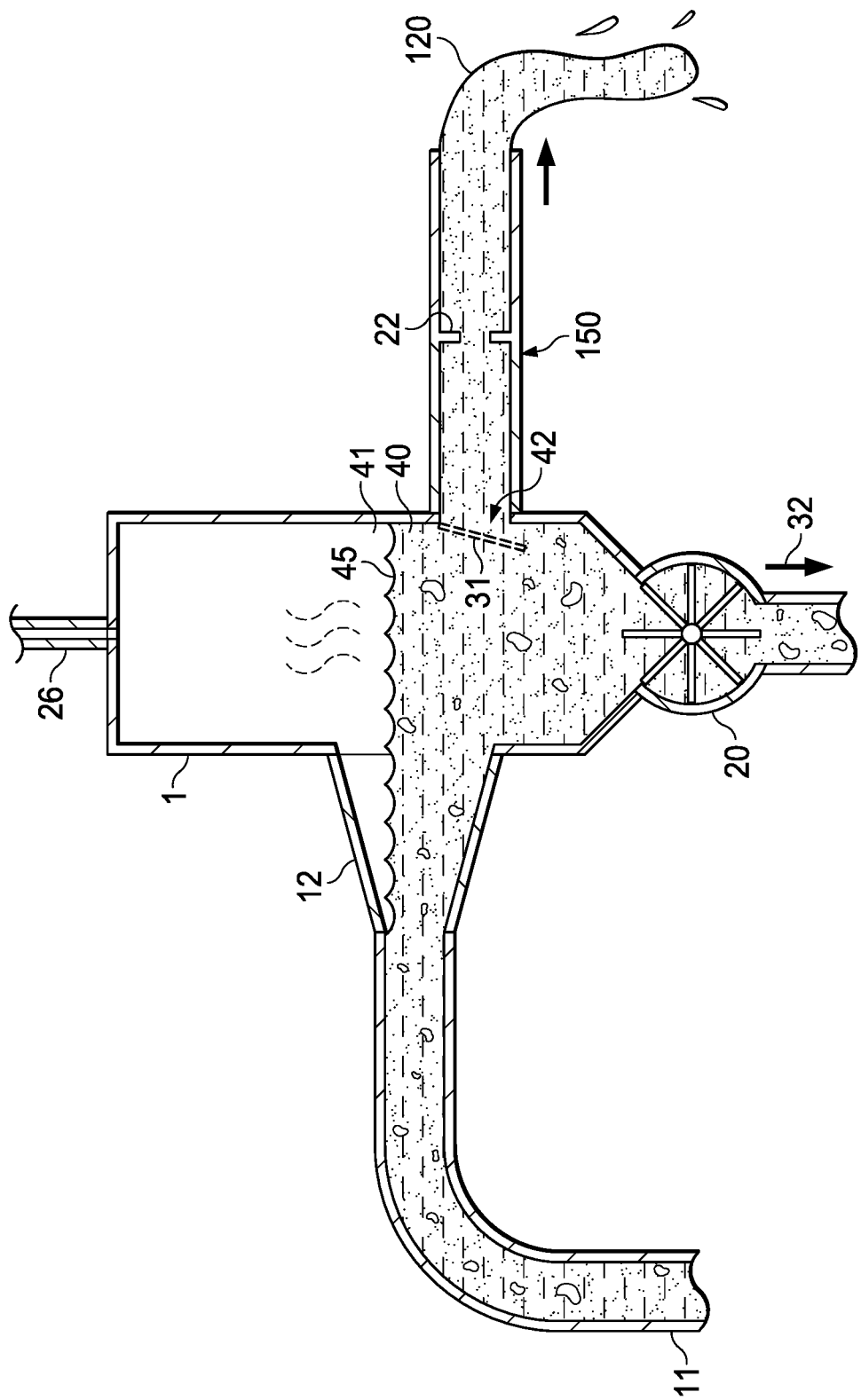
FIG. 1 shows an example embodiment of a split flow separator with a rotary valve for discharging liquid and coarse solids and a fixed choke and variable orifice throttle valve for discharging the fine slurry.

An example embodiment is disclosed in FIG. 1. Flow from the airlift riser 11 enters the separator 1 through a diffuser 12 in which the flow velocities and turbulence is reduced. Upon entering the separator 1, the difference in densities of the air 41, water and solids slurry 40 results in the air migrating to the top of the separator 1 where it is removed through an air discharge line 26.

A slurry 40 consisting of solids and liquid migrates to the bottom of the separator 1. Two pressure letdown channels are incorporated in the lower portion of the separator 1, below the air/liquid interface 45. Liquid and fine particles are discharged through a screen 31 which prevents large particles from leaving separator 1 at opening 42. This forms a fine slurry which then flows through opening 42 into fine slurry flowline 150. The flow of slurry through the opening 42 may be controlled, for example, by use of a fixed choke 22 together with a variable orifice valve. There may be multiple fixed chokes 22 or variable orifice valves to allow the fine slurry to be discharged at atmospheric pressure. The fine slurry 120 at atmospheric pressure may then be pumped, for example, to other equipment to separate solid particles from the water for storage or transportation. The variable orifice valve or the number of fixed chokes 22 may be adjusted to adjust the discharge pressure of the slurry 120 to a value greater than atmospheric pressure to eliminate the need for pumps to transfer slurry 120 to the other equipment. The larger particles settle to the bottom of the separator 1 by gravity, where they are removed by a rotary valve 20, sometimes referred as a star valve or rotary feeder.

The flow volume through the rotary valve 20 is fixed by the volume of the valve chambers and the speed of rotation of the valve. The volume of solids entering the chamber may be controlled by a device positioned above the rotary valve 20 to meter the solids flow rate. This device (not shown) may be a screw conveyor for example. The rotary valve discharges a coarse slurry 32 at atmospheric pressure. This coarse slurry may be pumped to other equipment, for example, to separate solid particles from water for storage or transportation.

Figure 2:
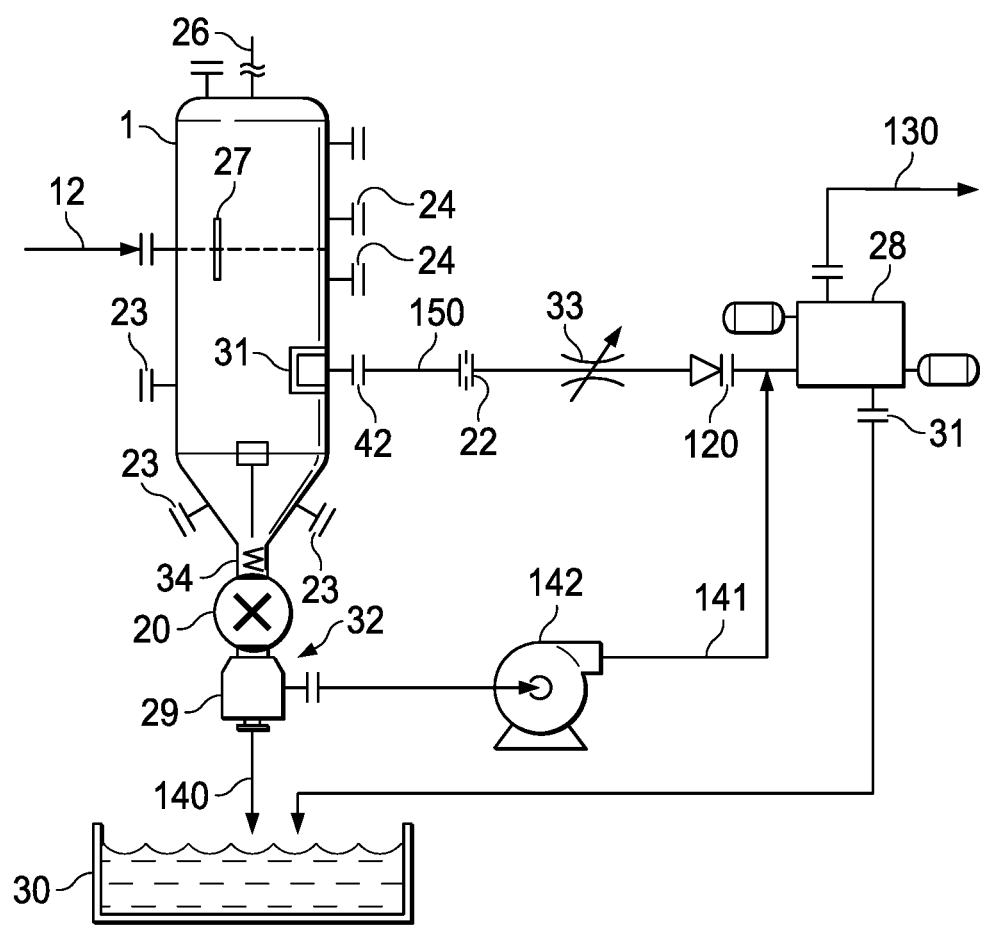
FIG. 2 shows an example embodiment with more details of the separator system in FIG. 1 with a mechanical feed device to control the flow of coarse solids to the rotary valve.

FIG. 2 shows a more detailed illustration of an example embodiment. An air-slurry mixture enters separator tank 1 through diffuser 12. The momentum of the flow is absorbed by a removable momentum absorber 27. The separator tank 1 includes cleanout openings 23 for entering the tank during service. Level bridles 24 are connected to the side of the tank 1 to facilitate measurement of the internal tank liquid level. In this example embodiment, air is removed through opening 26. The flow of slurry and fines which pass through screen 31 and outlet 42 is controlled by the pressure drop across the fixed choke 22 in line with a variable orifice valve 33 on the fine slurry flowline 150. Additional variable orifice valves and chokes may be added to allow finer control of the flow. The flow of coarse particles to the rotary valve 20 is controlled by a feeder 34 to prevent overfilling of a rotary valve chamber. In this example embodiment the low pressure fine slurry 120 passes to a centrifuge 28 which creates a thickened slurry 31 which is transported to storage 30, and a dilute slurry 130 which is disposed of as a waste stream. The low pressure coarse slurry 32 is passed to a vertical cuttings drier dewatering device 29 which separates water and particles smaller than a certain minimum size to create a slurry with small particles 141 which is further processed for recovery of small particles or delivered to a waste stream. In this embodiment pump 142 delivers the slurry with small particles 141 to the hydrocyclones 28 where the flow 141 is combined with flow from the fine slurry flowline 150. The vertical cuttings drier 29 also produces a concentrated slurry with water and coarse solids 140 which is combined with the thickened fine slurry 31 in the storage facility 30.

Figure 3:
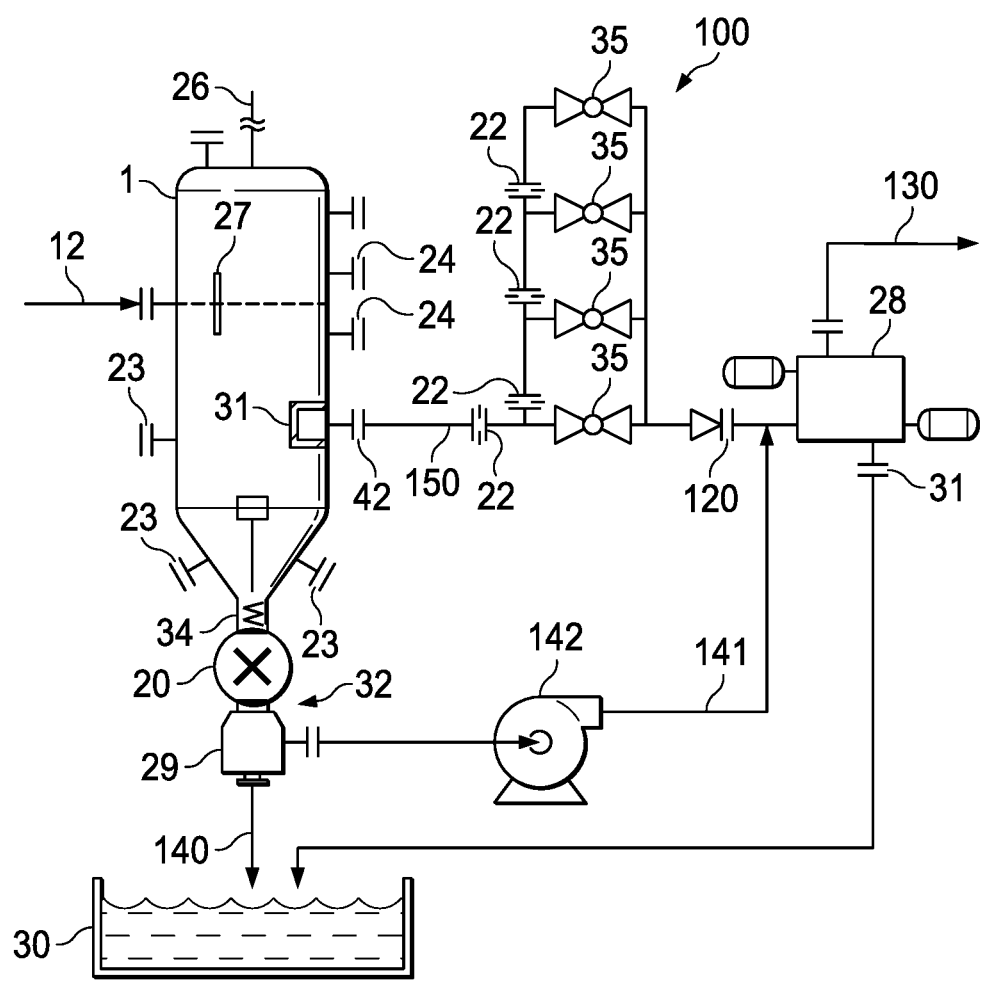
FIG. 3 shows an example embodiment of the separator system with a configuration of fixed chokes in-line and through a choke loop to control the flow if the fine slurry from the pressurized separator to atmospheric pressure.

Another example embodiment shown in FIG. 3 replaces the variable orifice valve 33 from FIG. 2 with a fixed choke loop 100 consisting a plurality of fixed chokes 22 and valves 35 to control the number of fixed chocks through which the slurry flows, thereby allowing control of the flow rate and pressure drop. In this example embodiment the flow of the slurry with fine particulates does not require variable orifice valves.

Figure 4:
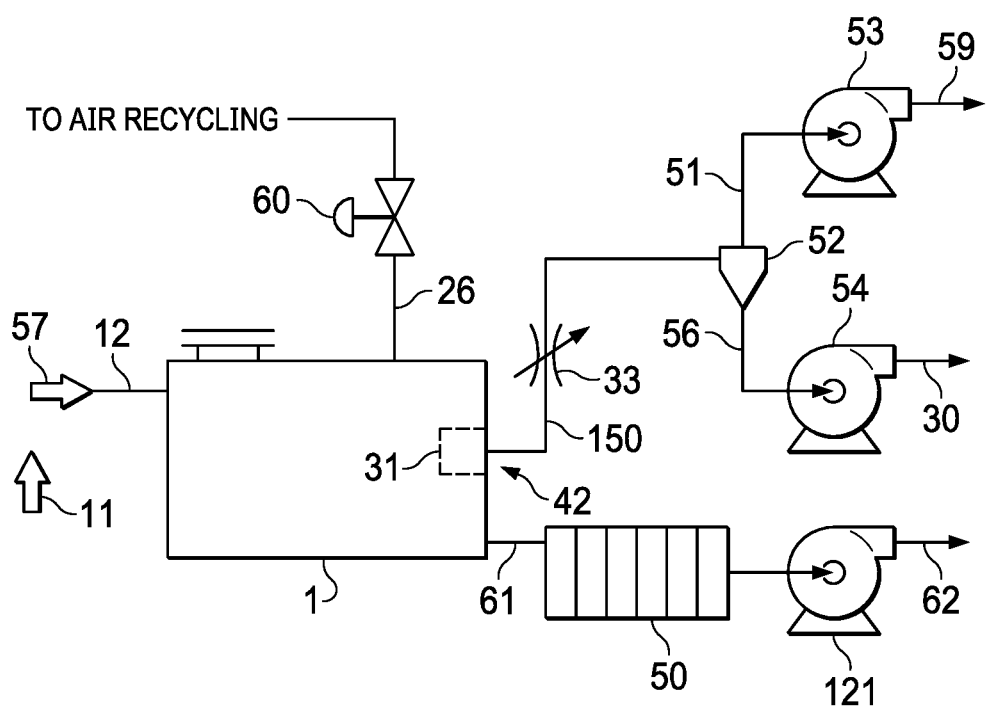
FIG. 4 shows an example embodiment with a crusher before the coarse slurry passes to a pressure letdown device to limit the maximum particle size.

An example embodiment shown in FIG. 4 includes the liquid and fines being discharged to a hydrocyclone 52 for concentration of the slurry.

The separation steps in the example embodiment of FIG. 4 are as follows. The 3-phase mixture comes from the air lift exit 11, through the elbow 57 and the diffuser 12. The mixture enters the 3-way separation tank 1. Air is extracted from the top 26 of the tank 1. Air flow is controlled by valve 60. The slurry with small particles is extracted from an intermediate depth where it passes through a screen 31 and opening 42 to a fine slurry flowline 150 to an optional variable orifice valve 33 to control the pressure and flow to a series of one or more hydrocyclones 52. The hydrocyclone overflow 51, which contains water and any solid particles below the design size cutoff size, travels through a lobe pump 53 (or other compact pressure letdown device) to the waste disposal system 59. The hydrocyclone underflow 56, which contains water and solid particles larger than the cutoff size, travels through a lobe pump 54 (or other compact pressure letdown device) to the storage system 30. The high-concentration slurry 61 with large and small particles travels through a crusher 50 to reduce the maximum particle size delivered to the progressive cavity pump 121 (or other pressure letdown equipment capable of handling large solids), and then to conventional slurry separation equipment 62.

Figure 5:
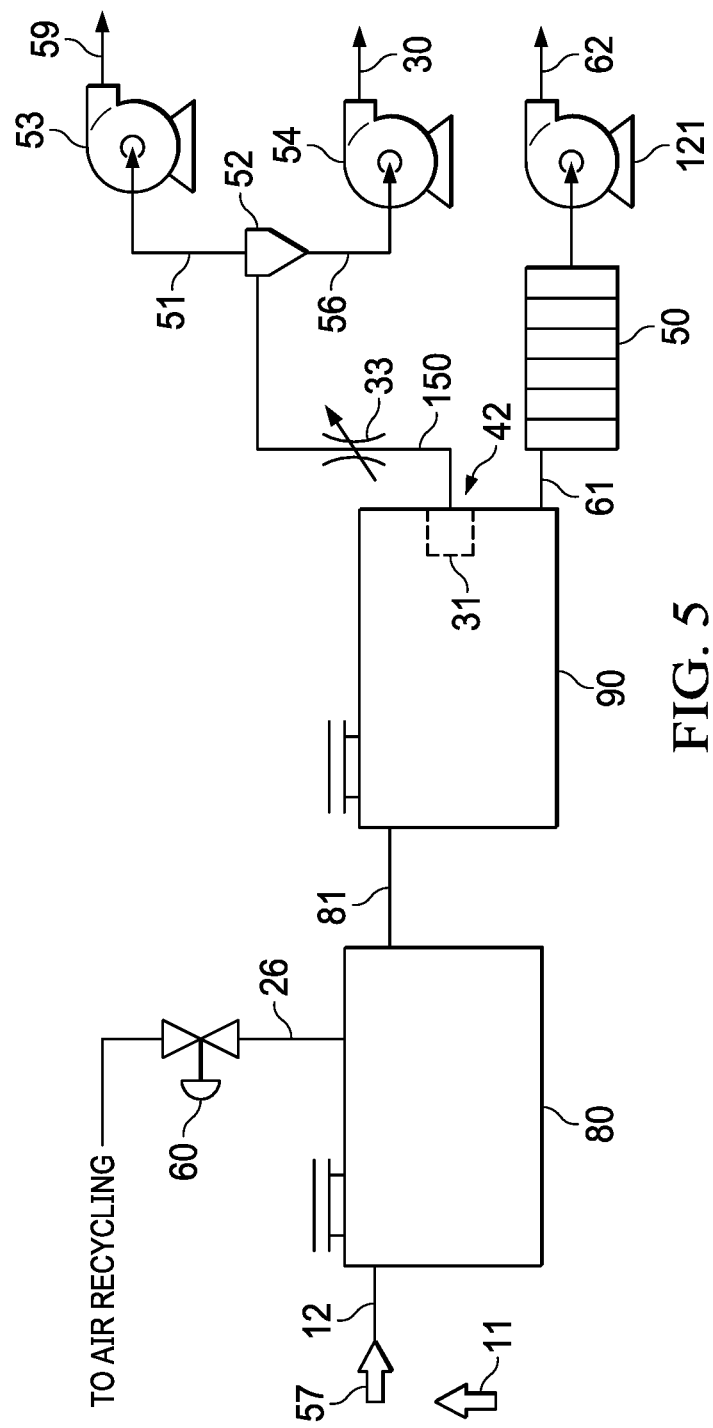
FIG. 5 shows an example embodiment using a sequential gas and slurry separation method.

An example embodiment is shown in FIG. 5, which includes two tanks 80 and 90. Tank 80 separates the slurry and air, and tank 90 separates the large-solid slurry from the small-solid slurry. The separation steps are as follows: The 3-phase mixture comes from the air lift exit 11, through the elbow 57 and diffuser 12. The mixture enters the first 2-way separator 80. Air is extracted from the top vent 26 of the tank 80. Airflow is controlled by valve 60. The slurry passes through an opening and through flowline 81 to a second 2-way separation tank 90. Tank 90 may be some distance from tank 80. The slurry with small particles passes through a screen 31 and passes through the outlet 42. The slurry with small particles travels to an optional variable orifice valve 33 via fine slurry flowline 150 to control the pressure and flow to a series of one or more hydrocyclones 52. The hydrocyclone overflow 51, which contains water and any solid particles below a desired size cutoff, travels through a lobe pump 53 (or other compact pressure letdown device) to the waste disposal system 59. The hydrocyclone underflow 56, which contains water and solid particles larger than the desired size cutoff, travels through a lobe pump 54 (or other compact pressure letdown device) to the storage system 30. The high-concentration slurry with large and small particles 61 travels through a crusher 50, to eliminate oversized particles, to a progressive cavity pump 121 (or other pressure letdown equipment capable of handling large solids), and then to conventional slurry separation equipment 62.

An example embodiment is shown in FIG. 6, which is similar to the example embodiment of FIG. 5 where the two-phased liquid-solid separation tank 90 is replaced with a gravity separation tank 110. The two-phase liquid solid flow 81 passes through a diffuser 82 to reduce velocity and enters tank 110, where the difference in settling velocities results in large particles settling to the bottom of tank 110 and passing to flowline 61, and fine particles pass to flowline 65. A variable orifice control valve in the fine slurry flowline 33 is used to adjust volume of slurry flow between the two discharges 65 and 61.

An example embodiment is shown in FIG. 7 where the slurry 81 comprising all the water and solids from the lift system 11 and Tank 80 (FIGS. 5 & 6) is sent into a crusher 50 to create a slurry with small particles 108. The slurry with small particles 108 passes through a variable orifice valve 33 (or other pressure control device) to hydrocyclone 52. The hydrocyclone overflow 51 passes to lobe pump 53 which reduces the pressure and passes the slurry with fine particles to disposal 59. The hydrocyclones underflow 56 with water and larger particles (but not so large as to prevent using a device such as a progressive cavity pump to process) passes to a progressive cavity pump 54 which reduces the pressure and allows passage of slurry 56 to storage 30. This would allow complete processing of the slurry and further minimize the amount of large-solid handling equipment necessary.

Although the invention has been described in terms of embodiments which are set forth in detail, it should be understood that this is by illustration only and that the invention is not necessarily limited thereto. Top and bottom could be left and right, respectively. For instance, gas and air could be used interchangeably. A vertical cuttings dryer is one type of solid-liquid separation device. Other types of separation devices include vibratory screens, hydrocyclones, centrifuges, settling tanks. Pressure let down devices described herein may include fixed chokes, variable orifice valves, a plurality of variable orifice valves in a series, combinations of fixed chokes and choke loops, lobe pumps, and progressive cavity pumps. Lobe pumps, progressive cavity pumps mentioned herein in regards to coarse slurry would also work for a fine slurry. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. An air-slurry separation system comprising:
a separating tank pressure vessel;
an air-slurry inlet to the separating tank pressure vessel from an airlift riser;
a diffuser adapted to reduce air-slurry flow velocity through the inlet into the separating tank pressure vessel;
an air release outlet located at or near the top of the separating tank pressure vessel;
a fine slurry outlet located at a mid-level of the separating tank pressure vessel coupled to a fine slurry flowline;
a screen on the fine slurry outlet limiting the maximum particle size that can enter the fine slurry flowline; and
a coarse slurry outlet at or near the bottom of the separating tank pressure vessel coupled to a coarse slurry flowline.

2. The slurry separation system of claim 1 further comprising a fine slurry pressure letdown system on the fine slurry flowline.

3. The slurry separation system in claim 2 further comprising one or more fixed chokes in the fine slurry flow.

4. The slurry separation system in claim 3 further comprising a hydro-cyclone after the one or more fixed chokes on the fine slurry flowline.

5. The slurry system in claim 2 further comprising one or more variable orifice valves in the fine slurry flowline.

6. The slurry system in claim 5 comprising one or more fixed chokes in-line with the variable orifice valves.

7. The slurry separation system of claim 1 further comprising a coarse slurry pressure letdown on the coarse slurry flowline.

8. The slurry separation system of claim 7 wherein the coarse slurry flow pressure letdown is a rotary feeder with pressure differential capability.

9. The slurry separation system of claim 7 wherein the coarse slurry pressure letdown is a progressive cavity pump.

10. The slurry separation system of claim 7 wherein the coarse slurry pressure letdown is a lobe pump.

11. The slurry separation system of claim 7 further comprising a solid-liquid separating device on the coarse slurry flowline after the coarse slurry pressure letdown.

12. The slurry separation system of claim 7 further comprising a vertical cuttings dryer after the coarse slurry pressure letdown.

13. An air-slurry separation system comprising:
a first separating tank pressure vessel for separation of air and slurry;
an air-slurry inlet to the first separating tank pressure vessel from an airlift riser;
a diffuser adapted to reduce air-slurry flow velocity through the inlet into the first separating tank pressure vessel;
an air release outlet located at or near the top of the first separating tank pressure vessel;
a slurry outlet located at the bottom of the of the first separating tank pressure vessel coupled to a slurry flowline;
a second separating tank pressure vessel for pressure letdown of slurry flowing through the slurry flowline;
a fine slurry outlet located at or near the top of the second separating tank pressure vessel coupled to a fine slurry flowline;
a screen on the fine slurry outlet limiting the maximum particle size that can enter the fine slurry flowline; and a coarse slurry outlet at or near the bottom of the second separating tank pressure vessel coupled to a coarse slurry flowline.

14. The slurry separation system of claim 13 further comprising a fine slurry pressure letdown system on the fine slurry flowline.

15. The slurry separation system of claim 13 further comprising a coarse slurry pressure letdown on the coarse slurry flowline.

16. The slurry separation system of claim 15 further comprising a solid-liquid separating device on the coarse slurry flowline after the coarse slurry pressure letdown.

17. An air-slurry separation system comprising:
- a separating tank pressure vessel for separation of air and slurry;
- an air-slurry inlet to the separating tank pressure vessel from an airlift riser;
- a diffuser adapted to reduce air-slurry flow velocity through the inlet into the separating tank pressure vessel;
- an air release outlet located at or near the top of the first separating tank pressure vessel;
- a slurry outlet located at the bottom of the of the first separating tank pressure vessel coupled to a slurry flowline; and
- a crusher attached to the slurry flowline to limit the maximum particle size in a fine slurry flowline exiting the crusher.

18. The slurry separation system of claim 17 further comprising a fine slurry pressure letdown system in the fine slurry flowline.

* * * * *